(12) United States Patent
Sano

(10) Patent No.: US 6,810,590 B2
(45) Date of Patent: Nov. 2, 2004

(54) STEERING ANGLE DETECTOR

(75) Inventor: Tadashi Sano, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 10/400,736

(22) Filed: Mar. 27, 2003

(65) Prior Publication Data
US 2003/0182810 A1 Oct. 2, 2003

(30) Foreign Application Priority Data

Mar. 28, 2002 (JP) .................................. 2002-091760

(51) Int. Cl.[7] ............................................. G01B 7/30
(52) U.S. Cl. ........................................................ 33/1 PT
(58) Field of Search ............................... 33/1 PT, 1 N, 33/534, 706, 707, 708

(56) References Cited

U.S. PATENT DOCUMENTS

| 4,989,329 | A | * | 2/1991 | Pullen ....................... 33/1 PT |
| 5,065,324 | A | * | 11/1991 | Oshita et al. ............... 33/1 PT |
| 5,218,769 | A | * | 6/1993 | Tranchon ..................... 33/1 PT |
| 6,226,569 | B1 | | 5/2001 | Peter et al. |
| 6,246,232 | B1 | | 6/2001 | Okumura |
| 6,298,565 | B1 | * | 10/2001 | Weber et al. ................ 33/1 PT |
| 6,574,876 | B2 | * | 6/2003 | Takeuchi ..................... 33/1 PT |

FOREIGN PATENT DOCUMENTS

JP        1 108 987 A1    6/2001

* cited by examiner

Primary Examiner—Christopher W. Fulton
(74) Attorney, Agent, or Firm—Brinks Hofer Gilson & Lione

(57) ABSTRACT

A rotation member which rotates in cooperation with a steering wheel is provided with a cord board and a turning amount and a turning direction of the steering wheel are detected by the cord board and photo-interrupters. A first gear of the rotation member meshes with a second gear to turn a screw shaft, thereby moving a carriage in an axial direction of the screw shaft and also moving a slit of a douser mounted to the carriage relative to an LED and a two-piece photodiode. An absolute angle from a neutral position of the steering wheel is detected based on a change in an amount of light received by the two-piece photodiode which changes according to a moving position of the slit.

17 Claims, 4 Drawing Sheets

STEERING ANGLE DETECTOR

BACKGROUND OF THE INVENTION

1. Field of the Invention

The present invention relates to a steering angle detector for detecting the steering angle or steering direction of a steering wheel mounted on an automobile and, particularly, to a steering angle detector having the function of detecting the absolute angle from the neutral position of a steering wheel.

2. Description of the Prior Art

A rotary encoder is generally used as a steering angle detector for a steering wheel. The rotor member of the rotary encoder is turned in cooperation with a steering wheel to detect the steering angle or steering direction of the steering wheel based on two different pulse signals having a phase difference of 90° output from the rotary encoder. Since the steering wheel is turned clockwise or counterclockwise from the neutral position a plurality of times, the steering angle detector must have the function of detecting the absolute angle from the neutral position of the steering wheel.

A rotary encoder which is turned in cooperation with a steering wheel and has a ratchet gear provided with a rotary switch for detecting the absolute angle from the neutral position of the steering wheel has been known as the steering angle detector having the above function. This conventionally known steering angle detector is constituted such that a pair of projections are formed at the periphery of the rotor member of the rotary encoder with a predetermined space therebetween, a plurality of ratchet teeth are formed alternately at two different levels of the ratchet gear, and only one of the ratchet teeth at a higher level projects into the turning locus of the projections. Therefore, according to the steering angle detector thus constituted, when the rotor member makes one revolution in cooperation with the steering wheel, the ratchet tooth contacts the projection of the rotor member to turn the ratchet gear by one tooth intermittently, thereby making it possible to detect the absolute angle from the neutral position of the steering wheel based on an output signal from the rotary switch which changes according to the rotation angle of the ratchet gear.

However, in the above-described steering angle detector of the prior art, every time the rotor member of the rotary encoder makes one revolution, the projection contacts the ratchet tooth to turn the ratchet gear by one tooth intermittently, thus making an impact sound offensive to the ear every time the projection contacts the ratchet tooth. Since the ratchet gear turns by one tooth intermittently to switch the contact point of the rotary switch every time the rotor member makes one revolution, although it can be detected how many revolutions the steering wheel has made based on the output signal of the rotary switch, the absolute angle within one revolution of the steering wheel cannot be detected. Thus, the resolution of absolute angle detection is low.

SUMMARY OF THE INVENTION

It is an object of the present invention which has been made in view of the above situation of the prior art to provide a steering angle detector which can reduce noise and improve the resolution of the absolute angle detection of a steering wheel.

To attain the above object, the steering angle detector of the present invention includes a rotation member which turns in cooperation with a steering wheel, first detection means for outputting a pulse signal corresponding to a rotation angle of the steering wheel in cooperation with a cord board mounted to the rotation member, a screw shaft having a spiral groove in an outer surface, a movable member which is engaged with the spiral groove to move linearly in an axial direction of the screw shaft, and second detection means for detecting an absolute angle from a neutral position of the steering wheel in cooperation with the movable member, wherein a first gear formed on the rotation member always meshes with a second gear formed on the screw shaft.

In the steering angle detector thus constituted, when the rotation member turns in cooperation with the steering wheel, the first detection means detects information on the rotation of the steering wheel in cooperation with the cord plate mounted to the rotation member, the movable member moves linearly in the axial direction of the screw shaft which turns in constant mesh the rotation member, and the second detection means detects the absolute angle from the neutral position of the steering wheel in cooperation with the movable member. Therefore, noise can be reduced by transmitting power from the rotation member to the screw shaft by meshing the gears of these members, and also the resolution of absolute angle detection can be improved by suitably setting the gear ratio of the first gear to the second gear and the pitch of the spiral groove of the screw shaft.

When the axial direction of the screw shaft is set parallel to a center axis of the rotation member in the above constitution, the steering angle detector can be reduced in size advantageously.

Any detection means is acceptable as the second detection means as long as it can detect the amount of movement of the movable member in the above constitution. Preferably, the second detection means includes a douser having a slit, a light emitting device and a light receiving device which are opposed to each other through the douser, and the movable member moves the douser, light emitting device and light receiving device relative to one another. When this light transmission type second detection means is employed, the amount of light received by the light receiving device can be changed analogly according to a change in the relative positions of the douser, light emitting device and light receiving device, thereby making it possible to improve the detection accuracy of absolute angle. It is preferred to mount the douser on the movable member side and the light emitting device and light receiving device on a fixed member placed opposite to the movable member.

Preferably, by use of a two-piece light receiving device having a first light receiver and a second light receiver as the light receiving device in the above constitution, the ratio of the amount of light received by the first light receiver to the amount of light received by the second light receiver is changed by moving the two-piece light receiving device and the slit relative to each other. The slit preferably has a linear portion which is inclined toward a moving direction of the movable member, whereby a change in the amount of light received by the two-piece light receiving device can be detected more accurately. Particularly when the whole shape of the two-piece light receiving device is rectangular and the linear portion of the slit is made substantially perpendicular to the long sides of the two-piece light receiving device, the dead area of the two-piece light receiving device is reduced advantageously.

DESCRIPTION OF THE PREFERRED EMBODIMENTS

Figure 1:
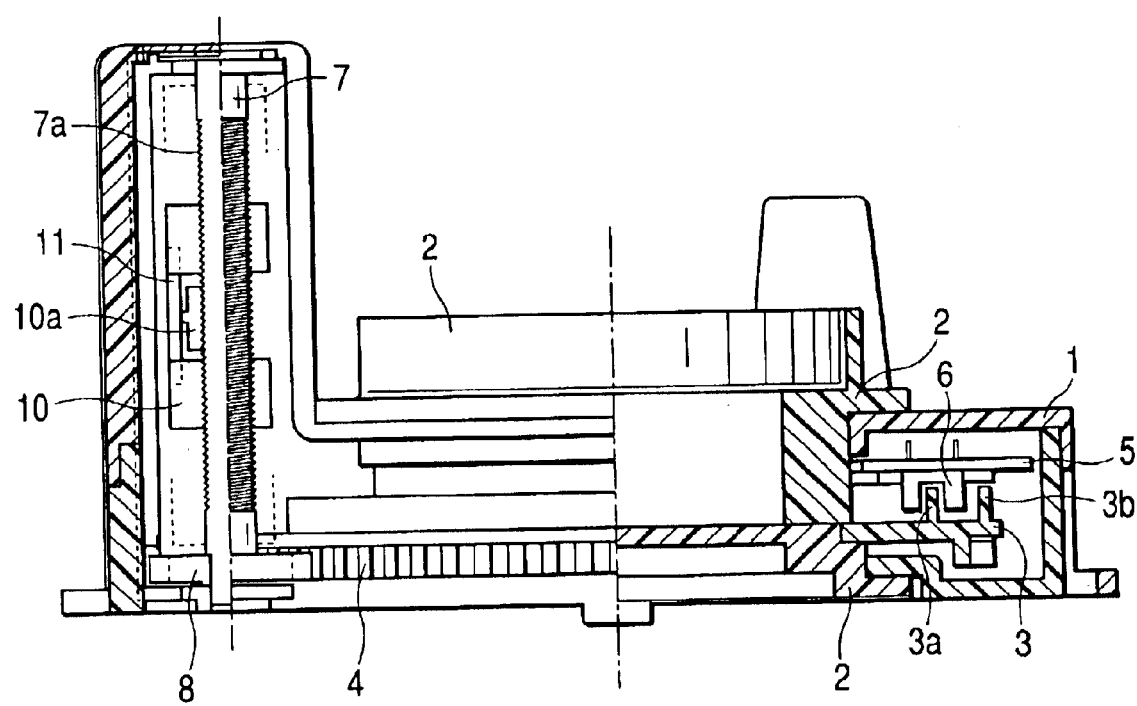
FIG. 1 is a partially exploded side view of a steering angle detector according to an embodiment of the present invention.

A preferred embodiment of the present invention will be described with reference to the accompanying drawings. FIG. 1 is a partially exploded side view of a steering angle detector according to an embodiment of the present invention, FIG. 2 is a plan view showing the internal constitution of the steering angle detector, FIG. 3 is a diagram for explaining second detection means provided in the steering angle detector, FIG. 4 is a diagram for explaining a douser, a light emitting device and a light receiving device provided in the second detection means, FIG. 5 is a diagram for explaining the relationship between the slit of the douser and the light receiving device, and FIG. 6 is a diagram for explaining the detection of an absolute angle based on the amount of light received by the light receiving device.

Figure 2:
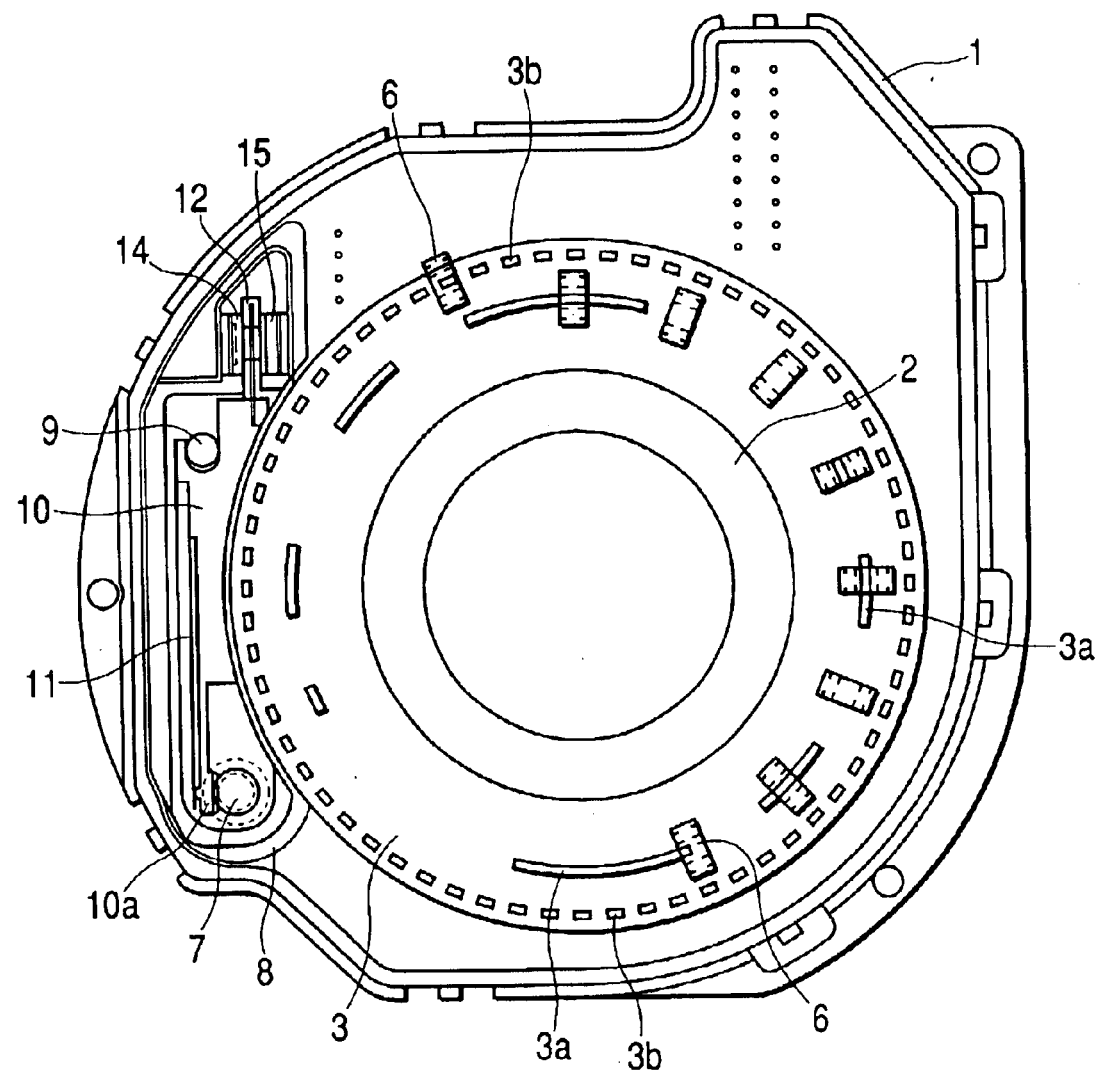
FIG. 2 is a plan view showing the internal constitution of the steering angle detector.
Figure 3:
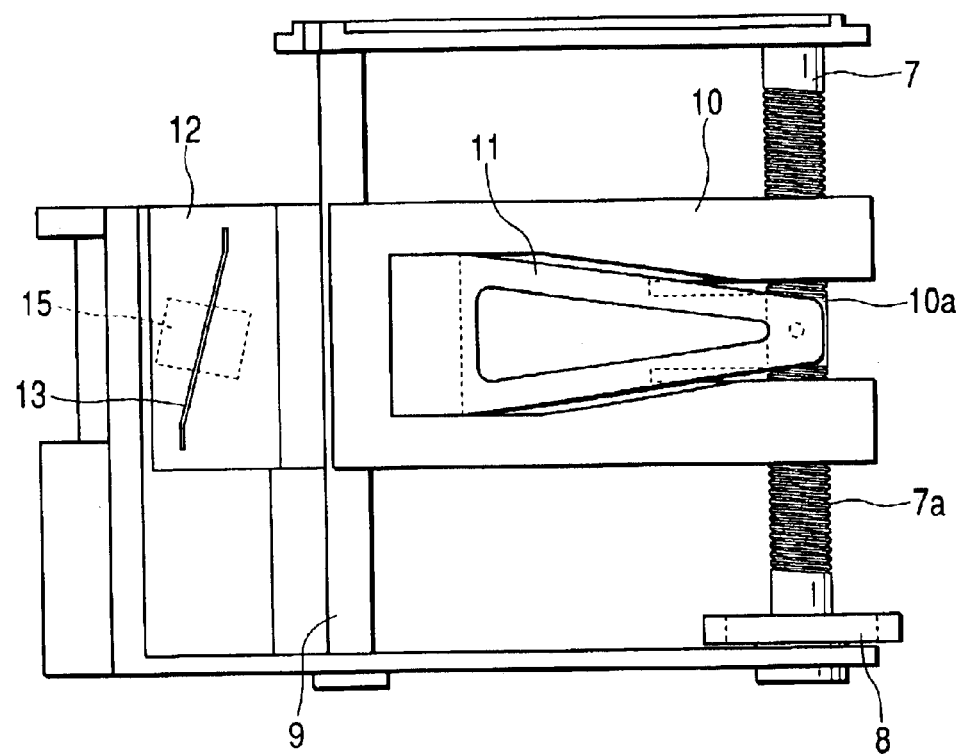
FIG. 3 is a diagram for explaining second detection means provided in the steering angle detector.
Figure 4:
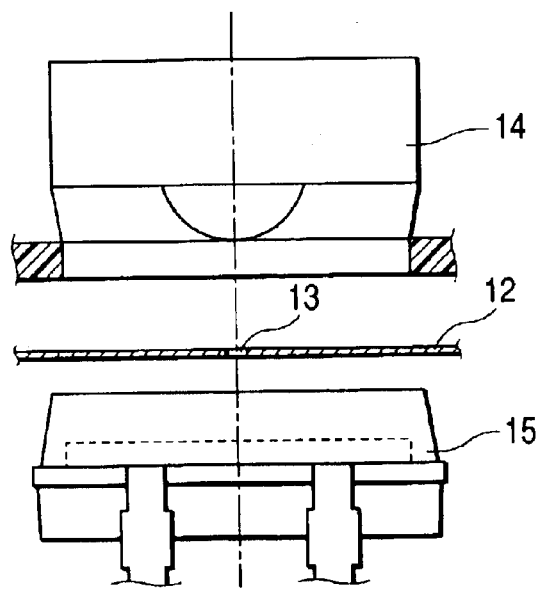
FIG. 4 is a diagram for explaining a douser, a light emitting device and a light receiving device provided in the second detection means.

As shown in FIGS. 1 to 3, the steering angle detector of this embodiment includes an outer case 1 fixed to the stator member of an unshown steering system, and a rotation member 2 is rotatably supported to the outer case 1. An unshown steering shaft is inserted into the center of this rotation member 2, and an unshown steering wheel is connected to the rotation member 2. A cord board 3 is integrated with the rotation member 2 as a single unit, and a first gear 4 is formed on the outer surface of the lower portion of the rotation member 2. Inner projections 3a and outer projections 3b are arranged on the cord board 3 concentric to each other, and a plurality of photo-interrupters 6 corresponding to the inner projections 3a and the outer projections 3b are mounted on a printed circuit board 5 fixed to the outer case 1. The cord board 3 and the photo-interrupters 6 constitute first detection means which detects the turning amount and turning direction of the steering wheel for turning the rotation member 2 based on pulse signals outputted from the photo-interrupters 6 along with the rotation of the rotation member 2.

A screw shaft 7 is rotatably supported inside the outer case 1 in such a manner that the axial direction of this screw shaft 7 and the center axis of the rotation member 2 are set parallel to each other. A second gear 8 is fixed to one end of the screw shaft 7 and meshes with the first gear 4 of the rotation member 2. A guide shaft 9 extending in parallel to the screw shaft 7 is secured in the outer case 1, and a carriage 10 which is a movable member is slidably engaged with this guide shaft 9. A spiral groove 7a is formed in the outer surface of the screw shaft 7 and meshes with an engagement tooth 10a integrated with the carriage 10, and this engagement tooth 10a is press-contacted to the spiral groove 7a with elastic urging force of a leaf spring 11 attached to the carriage 10. Therefore, when the screw shaft 7 turns, the engagement tooth 10a moves along the spiral groove 7a, and the carriage 10 reciprocatively moves linearly in the axial direction of the screw shaft 7 and the guide shaft 9. Further, a shield plate 12 is integrated with the end opposite to the engagement tooth 10a of the carriage 10, and a slit 13 is formed in the douser 12. Meanwhile, an LED 14 which is a light emitting device and a two-piece photodiode 15 which is a light receiving device are placed in the outer case 1 in such a manner that, as shown in FIG. 4, the LED 14 and the two-piece photodiode 15 are opposed to each other through the slit 13 of the douser 12, and light emitted from the LED 14 passes through the slit 13 of the douser 12 and is received by the two-piece photodiode 15.

Figure 5:
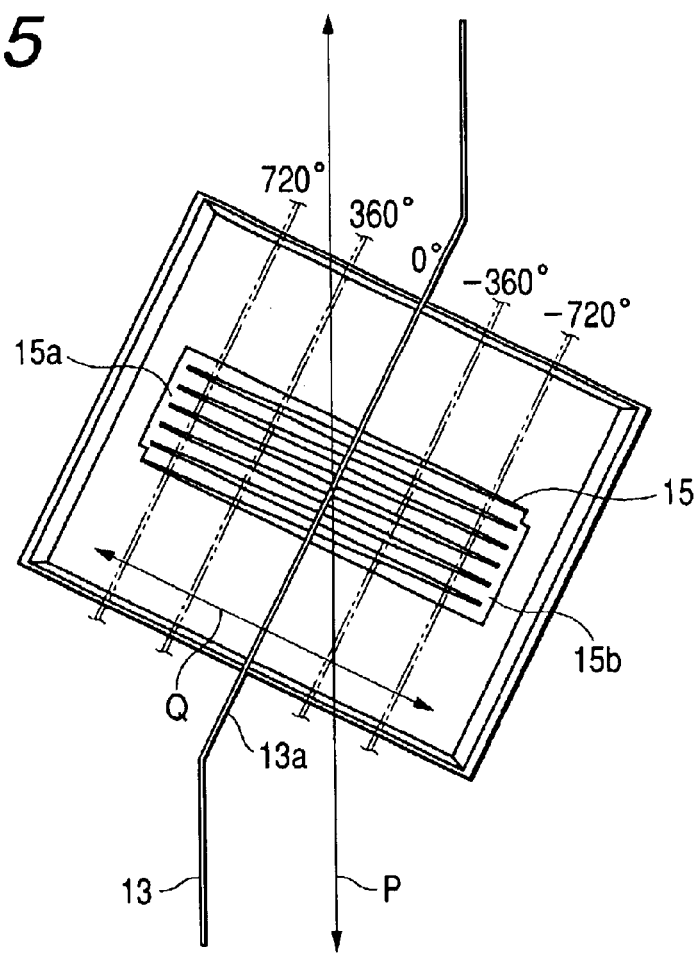
FIG. 5 is a diagram for explaining the relationship between the slit of the douser and the light receiving device.
Figure 6:
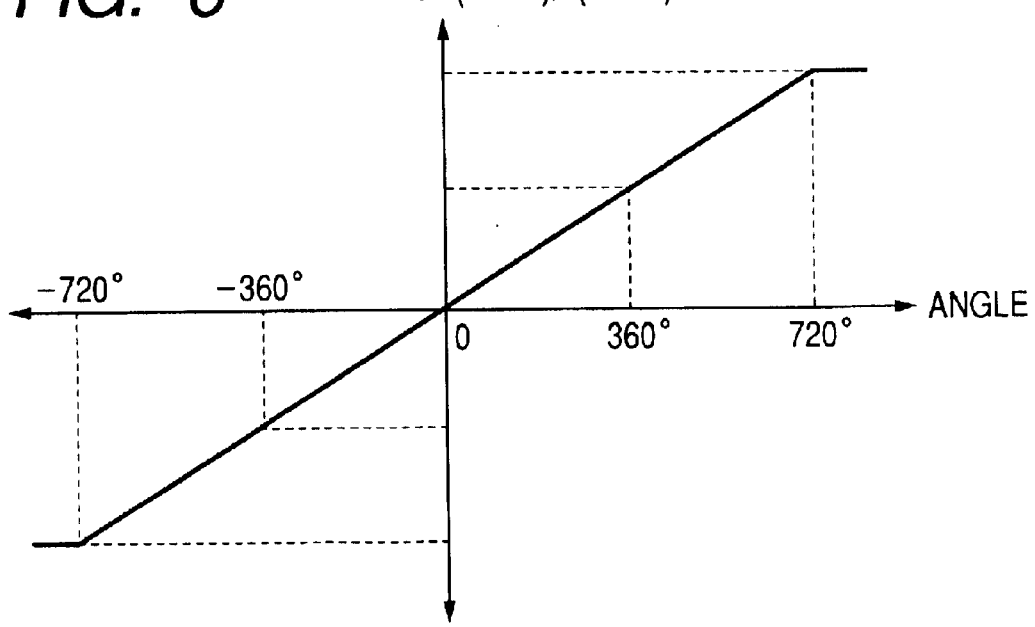
FIG. 6 is a diagram for explaining the detection of absolute angle based on the amount of light received by the light receiving device.

As shown in FIG. 5, the two-piece photodiode 15 has a first light receiver 15a and a second light receiver 15b which are separated from each other by a comb-like parting line and is formed rectangular as a whole. The slit 13 has a linear portion 13a which is inclined toward the moving direction (direction shown by an arrow P in the figure) of the carriage 10, and this linear portion 13a is set almost perpendicular to the long sides of the two-piece photodiode 15. Therefore, when the carriage 10 moves in the direction shown by the arrow P along with the rotation of the screw shaft 7, the linear portion 13a of the slit 13 moves in a direction (direction shown by an arrow Q in the figure) along to the long sides between the opposite short sides of the two-piece photodiode 15, and the amounts of light received by the first and second light receivers 15a and 15b change according to the moving position of the linear portion 13a. The slit 13 of the above douser 12, the LED 14 and the two-piece photodiode 15 constitute second detection means for detecting the absolute angle from the neutral position of the steering wheel based on the output values of the first and second light receivers 15a and 15b which change along with the movement of the carriage 10.

That is, when the steering wheel makes two revolutions (+720° to −720°) clockwise and counterclockwise based on the neutral position, as shown by two-dot chain lines in FIG. 5, the relative positions of the linear portion 13a and the first and second light receivers 15a and 15b change according to the rotation angle of the steering wheel. Therefore, by calculating current values obtained from the first and second light receivers 15a and 15b, the absolute angle from the neutral position of the steering wheel can be detected. For example, when a current value obtained from the first light receiver 15a is represented by $I_1$ and a current value obtained from the second light receiver 15b is represented by $I_2$, these current values $I_1$ and $I_2$ change according to the moving position of the linear portion 13a.

$$I = (I_1 - I_2)/(I_1 + I_2) \tag{1}$$

As shown in FIG. 6, by calculating the above value, the absolute angle of the steering wheel can be detected as an analog change in the current value I.

A description is subsequently given of the operation of the steering angle detector constituted as described above.

When the steering wheel is turned, the rotation member 2 turns in cooperation with the steering wheel and this torque is transmitted from the first gear 4 to the second gear 8, thereby turning the screw shaft 7 in cooperation with the rotation member 2. Since the cord board 3 is integrated with the rotation member 2, the relative positions of the inner projections 3a and outer projections 3b of the cord board 3 and the photo-interrupters 6 are changed by the rotation of the rotation member 2, and the turning amount and turning direction of the steering wheel are detected based on pulse signals outputted from the photo-interrupters 6. The cord board 3 and the photo-interrupters 6 serve as an incremental rotary encoder. Since the steering wheel makes two revolutions (+720° to −720°) clockwise and counterclockwise based on the neutral position of the steering wheel in this embodiment, the turning amount and turning direction within the rotation range (±720°) of the steering wheel are detected based on output signals from the photo-interrupters 6.

Since the engagement tooth 10a of the carriage 10 meshes with the spiral groove 7a of the screw shaft 7, the carriage 10 reciprocatively moves linearly in the axial direction of the screw shaft 7 and the guide shaft 9 along with the rotation of the screw shaft 7, and the douser 12 integrated with the carriage 10 moves between the LED 14 and the two-piece photodiode 15. As a result, the linear portion 13a of the slit 13 formed in the douser 12 moves between the opposite short sides of the two-piece photodiode 15 in the direction shown by the arrow Q in FIG. 5, and the amounts of light received by the first and second light receivers 15a and 15b change according to the moving position, thereby detecting the absolute angle from the neutral position of the steering wheel based on output values from the first and second light receivers 15a and 15b. In this case, when current values $I_1$ and $I_2$ output from the first and second light receivers 15a and 15b are detected and inserted into the above equation (1) to calculate a current value I, the absolute angle of the steering wheel can be detected as an analog change in the current value I as shown in FIG. 6. As the steering wheel makes two revolutions (+720° to −720°) clockwise and counterclockwise based on the neutral position in the case of this embodiment, the absolute angle within the total rotation range (±720°) of the steering wheel is detected based on output signals from the two-piece photodiode 15. In addition, as the current value I obtained from the output signals of the two-piece photodiode 15 changes analogly, the detectable absolute angle of the steering wheel is not limited by a whole number of revolutions (0, ±1, ±2). For example, the absolute angle of the steering wheel can be detected each time the steering wheel makes half a revolution (180°).

In the above embodiment, an incremental rotary encoder including the inner and outer projections 3a, 3b of the cord board 3 is used as the first detection means for detecting the turning amount and turning direction of the steering wheel. Besides the above rotary encoder, a magnetic or brush rotary encoder may also be used.

The present invention is carried out as described above and has the following effects.

When the rotation member turns in cooperation with the steering wheel, the first detection means detects information on the rotation of the steering wheel in cooperation with the cord board mounted to the rotation member, the movable member moves linearly in the axial direction of the screw shaft which turns in constant mesh with the rotation member, and the second detection means detects the absolute angle from the neutral position of the steering wheel in cooperation with the movable member. Therefore, power is transmitted from the rotation member to the screw shaft through the mesh of gears, thereby making it possible to reduce noise, and the resolution of absolute angle detection can be improved by suitably setting the gear ratio of the first gear to the second gear and the pitch of the spiral groove of the screw shaft. When the axial direction of the screw shaft is set parallel to the center axis of the rotation member, the steering angle detector can be reduced in size.

When the second detection means includes a douser having a slit and a light emitting device and a light receiving device which are opposed to each other through this douser, and the movable member moves the douser, light emitting device and light receiving device relatively to one another, the amount of light received by the light receiving device can be changed analogly according to a change in the relative positions within the relative moving ranges of the douser, light emitting device and light receiving device, thereby making it possible to improve the detection accuracy of the absolute angle. When the douser is provided on the movable member side and the light emitting device and the light receiving device are arranged on a fixed member opposed to the movable member, the processing system for transmitting an output signal from the light receiving device can be simplified.

When the two-piece light receiving device having a first light receiver and a second light receiver is used as the light receiving device, this two-piece light receiving device and the slit move relative to each other to change the ratio of the amount of light received by the first light receiver to the amount of light received by the second receiving portion, and a linear portion inclined toward the moving direction of the movable member is formed in the slit, a change in the amount of light received by the two-piece light receiving device can be detected more accurately. Particularly when the whole shape of the two-piece light receiving device is rectangular and the linear portion of the slit is made substantially perpendicular to the long sides of the two-piece light receiving device, the dead area of the two-piece light receiving device can be reduced, thereby making it possible to downsize the steering angle detector.

What is claimed is:

1. A steering angle detector comprising:
    a rotation member which turns in cooperation with a steering wheel;
    a first detector that outputs a pulse signal corresponding to a rotation angle of the steering wheel in cooperation with a cord board mounted to the rotation member;
    a screw shaft having a spiral groove in an outer surface;
    a movable member which is engaged with the spiral groove to move linearly in an axial direction of the screw shaft; and
    a second detector that detects an absolute angle from a neutral position of the steering wheel in cooperation with the movable member,
    a first gear formed on the rotation member always meshes with a second gear formed on the screw shaft, and
    wherein the second detector comprises a douser having a slit and a light emitting device and a light receiving device which are opposed to each other through the douser, and wherein the movable member moves the douser, light emitting device and light receiving device relative to one another; the light receiving device is a two-piece light receiving device having a first light receiver and a second light receiver, and wherein the two-piece light receiving device and the slit move relative to each other to change a ratio of an amount of light received by the first light receiver to an amount of light received by the second light receiver; and, the slit has a linear portion inclined toward a moving direction of the movable member.

2. The steering angle detector according to claim 1, wherein the two-piece light receiving device is formed rectangular, and wherein the linear portion of the slit is made substantially perpendicular to long sides of the two-piece light receiving device.

3. The steering angle detector according to claim 2, wherein the douser is mounted on the movable member, and wherein the light emitting device and the light receiving device are placed on a fixed member opposed to the movable member.

4. The steering angle detector according to claim 3, wherein the axial direction of the screw shaft is set parallel to a center axis of the rotation member.

5. The steering angle detector according to claim 2, wherein the two-piece light receiving device has two positions which are separated from each other by a comb-like parting line.

6. The steering angle detector according to claim 3, wherein the two-piece light receiving device has two positions which are separated from each other by a comb-like parting line.

7. The steering angle detector according to claim 4, wherein the two-piece light receiving device has two positions which are separated from each other by a comb-like parting line.

8. The steering angle detector according to claim 1, wherein the douser is mounted on the movable member, and wherein the light emitting device and the light receiving device are placed on a fixed member opposed to the movable member.

9. The steering angle detector according to claim 8, wherein the axial direction of the screw shaft is set parallel to a center axis of the rotation member.

10. The steering angle detector according to claim 9, wherein the two-piece light receiving device has two positions which are separated from each other by a comb-like parting line.

11. The steering angle detector according to claim 8, wherein the two-piece light receiving device has two positions which are separated from each other by a comb-like parting line.

12. The steering angle detector according to claim 1, wherein the axial direction of the screw shaft is set parallel to a center axis of the rotation member.

13. The steering angle detector according to claim 12, wherein the two-piece light receiving device is formed rectangular, and wherein the linear portion of the slit is made substantially perpendicular to long sides of the two-piece light receiving device.

14. The steering angle detector according to claim 13, wherein the slit has a linear portion inclined toward a moving direction of the movable member.

15. The steering angle detector according to claim 12, wherein the two-piece light receiving device has two positions which are separated from each other by a comb-like parting line.

16. The steering angle detector according to claim 13, wherein the two-piece light receiving device has two positions which are separated from each other by a comb-like parting line.

17. The steering angle detector according to claim 1, wherein the two-piece light receiving device has two positions which are separated from each other by a comb-like parting line.

* * * * *

UNITED STATES PATENT AND TRADEMARK OFFICE
CERTIFICATE OF CORRECTION

PATENT NO. : 6,810,590 B2
DATED : November 2, 2004
INVENTOR(S) : Tadashi Sano

It is certified that error appears in the above-identified patent and that said Letters Patent is hereby corrected as shown below:

<u>Title page,</u>
Item [56], References Cited, FOREIGN PATENT DOCUMENTS, delete "JP    1 108 987 A1" and substitute -- EP    1 108 987 A1 -- in its place.

Signed and Sealed this

Eighteenth Day of October, 2005

JON W. DUDAS
*Director of the United States Patent and Trademark Office*